(12) United States Patent
Werner et al.

(10) Patent No.: US 8,469,130 B2
(45) Date of Patent: Jun. 25, 2013

(54) CAB STAY

(75) Inventors: Gregory K. Werner, Durango, IA (US); Francois Stander, Dubuque, IA (US)

(73) Assignee: Deere & Company, Moline, IL (US)

( * ) Notice: Subject to any disclaimer, the term of this patent is extended or adjusted under 35 U.S.C. 154(b) by 203 days.

(21) Appl. No.: 13/030,243

(22) Filed: Feb. 18, 2011

(65) Prior Publication Data
US 2012/0211294 A1   Aug. 23, 2012

(51) Int. Cl.
*B62D 33/07* (2006.01)

(52) U.S. Cl.
USPC ............. 180/89.14; 180/89.13; 180/89.17; 296/190.04; 296/190.06

(58) Field of Classification Search
USPC . 180/69.2, 69.24, 89.13–89.14, 89.17–89.18, 180/311; 280/781; 296/203.01–203.02, 190.04, 296/190.05, 190.06
See application file for complete search history.

(56) References Cited

U.S. PATENT DOCUMENTS

| | | | | |
|---|---|---|---|---|
| 2,091,673 A * | 8/1937 | De Orlow | ............. | 180/69.2 |
| 4,253,700 A * | 3/1981 | Di Francescantonio | . | 296/190.05 |
| 4,279,321 A * | 7/1981 | Stone | ............. | 180/89.14 |
| 4,522,528 A * | 6/1985 | Bewers | ............. | 403/61 |
| 4,969,533 A * | 11/1990 | Holm et al. | ............. | 180/273 |
| 5,551,826 A * | 9/1996 | Todd et al. | ............. | 414/685 |
| 5,791,428 A * | 8/1998 | Noll et al. | ............. | 180/69.21 |
| 5,992,550 A * | 11/1999 | Gronlund | ............. | 180/69.21 |
| 6,048,018 A * | 4/2000 | Shambeau et al. | ............. | 296/57.1 |
| 6,167,977 B1 * | 1/2001 | Adamson et al. | ............. | 180/69.2 |
| 6,269,521 B1 * | 8/2001 | Gabel | ............. | 16/287 |
| 6,871,716 B2 * | 3/2005 | Sanderson | ............. | 180/69.21 |
| 6,910,731 B2 * | 6/2005 | Albright et al. | ............. | 296/190.05 |
| 7,162,816 B2 * | 1/2007 | Otsuka et al. | ............. | 37/347 |
| 7,607,721 B2 * | 10/2009 | Grimes et al. | ............. | 296/190.01 |
| 7,845,053 B2 * | 12/2010 | Marsh et al. | ............. | 16/357 |
| 7,926,603 B2 * | 4/2011 | Bonsen | ............. | 180/69.21 |
| 7,938,477 B2 * | 5/2011 | Togama et al. | ............. | 296/190.06 |
| 7,959,218 B2 * | 6/2011 | Endou | ............. | 296/190.06 |

FOREIGN PATENT DOCUMENTS

| | | | |
|---|---|---|---|
| EP | 936131 A2 | * | 8/1999 |
| JP | 55123570 A | * | 9/1980 |
| JP | 2004017796 A | * | 1/2004 |
| JP | 2006347444 A | * | 12/2006 |

OTHER PUBLICATIONS

Erwin Bachle, Tilting apparatus for suspended cabs of trucks, Aug. 18, 1999, EPO, EP 0 936 131 A2, English Abstract.*
Erwin Bachle, Tilting apparatus for suspended cabs of trucks, Aug. 18, 1999, EPO, EP 0 936 131 A2, Machine Translation of Description.*
Background Information (1 page) (prior art before Feb. 18, 2011).
Deere D Series Articulated Dump Truck Product Brochure (20 pages) (Nov. 2009).
Image of Deere Articulated Dump Truck with Cab Stay (1 page) (prior art before Feb. 18, 2011).
Online Thread at http://cr4.globalspec.com/thread/41823/Latch-for-Truck-s-Cab-Tilt-System (8 pages)(2009).

* cited by examiner

*Primary Examiner* — Ruth Ilan
*Assistant Examiner* — James English

(57) ABSTRACT

A work vehicle comprises a front frame, a rear frame, an oscillation frame, a slew bearing, and a rolling-element bearing. The slew bearing and the rolling-element bearing allow oscillation between the oscillation frame and the rear frame about a fore-aft axis.

12 Claims, 8 Drawing Sheets

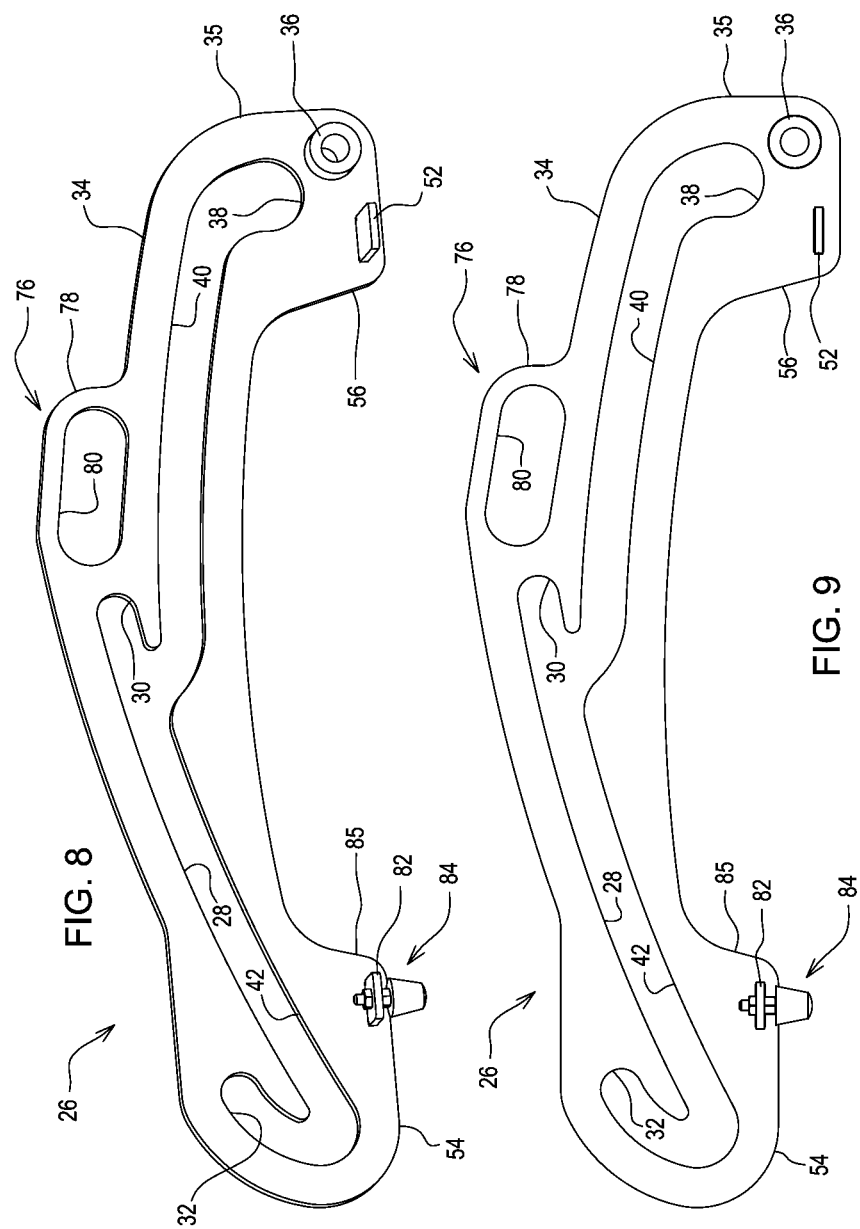

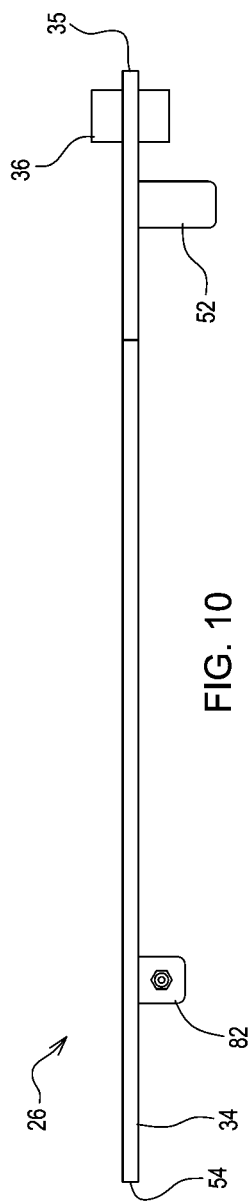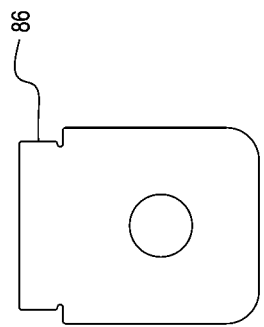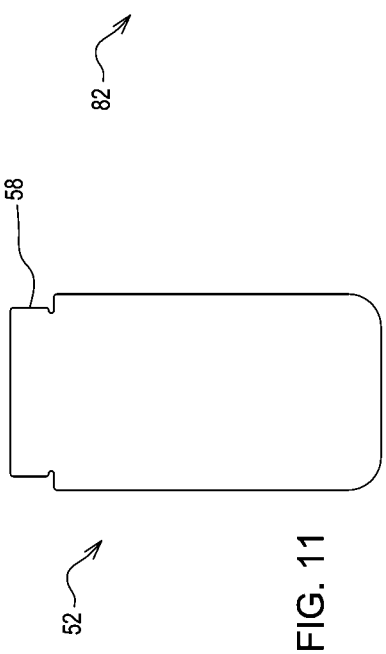

CAB STAY

FIELD OF THE DISCLOSURE

The present disclosure relates to a tiltable cab of a machine. More particularly, the present disclosure relates to a cab stay for the cab.

BACKGROUND OF THE DISCLOSURE

There are articulated dump trucks which have a cab that is tiltable (e.g., laterally tiltable relative to a fore-aft axis of the truck). The cab is coupled pivotally to a frame of the truck so as to be tiltable relative to the frame for servicing of the truck and performing diagnostic testing on the truck. A hydraulic cab-lift cylinder is filled by operation of a jack to tilt the cab, and a release on the jack can be activated to lower the cab.

A cab stay has been used to hold the cab selectively in a first tilted position or a higher second tilted position. It is sometimes sufficient to tilt the cab to the first tilted position (e.g., for servicing and performing diagnostic testing in accessible areas while the truck is operating), and, at other times, the cab needs to be tilted to the higher second tilted position (e.g., to remove parts that are otherwise difficult to access).

SUMMARY OF THE DISCLOSURE

According to an aspect of the present disclosure, a machine may comprise a frame, a cab, and a cab stay. The cab may be coupled pivotally to the frame to move relative to the frame between a home position and a tilted position. The cab may comprise a stud and a stay retainer. The cab stay may be coupled pivotally to the frame to move relative to the frame between a storage position and a use position. The cab stay may comprise a slot in which the stud is positioned in and between the home and tilted positions of the cab. In the use position of the cab stay a notch of the slot may engage the stud holding the cab in the tilted position of the cab. The stay retainer may apply pressure on the cab stay due at least partially to the weight of the cab so as to hold the cab stay in the storage position when the cab is positioned in the home position of the cab. The cab stay may thus be prevented from vibrating in manner that would generate audible noise.

The above and other features will become apparent from the following description and the attached drawings.

BRIEF DESCRIPTION OF THE DRAWINGS

The detailed description of the drawing refers to the accompanying figures in which:

FIG. 8 is a perspective view of the cab stay;

FIG. 9 is a front elevation view of the cab stay;

FIG. 10 is a top plan view of the cab stay; and

FIGS. 11 and 12 are top plan views of tabs of the cab stay.

DETAILED DESCRIPTION OF THE DRAWINGS

Figure 1:
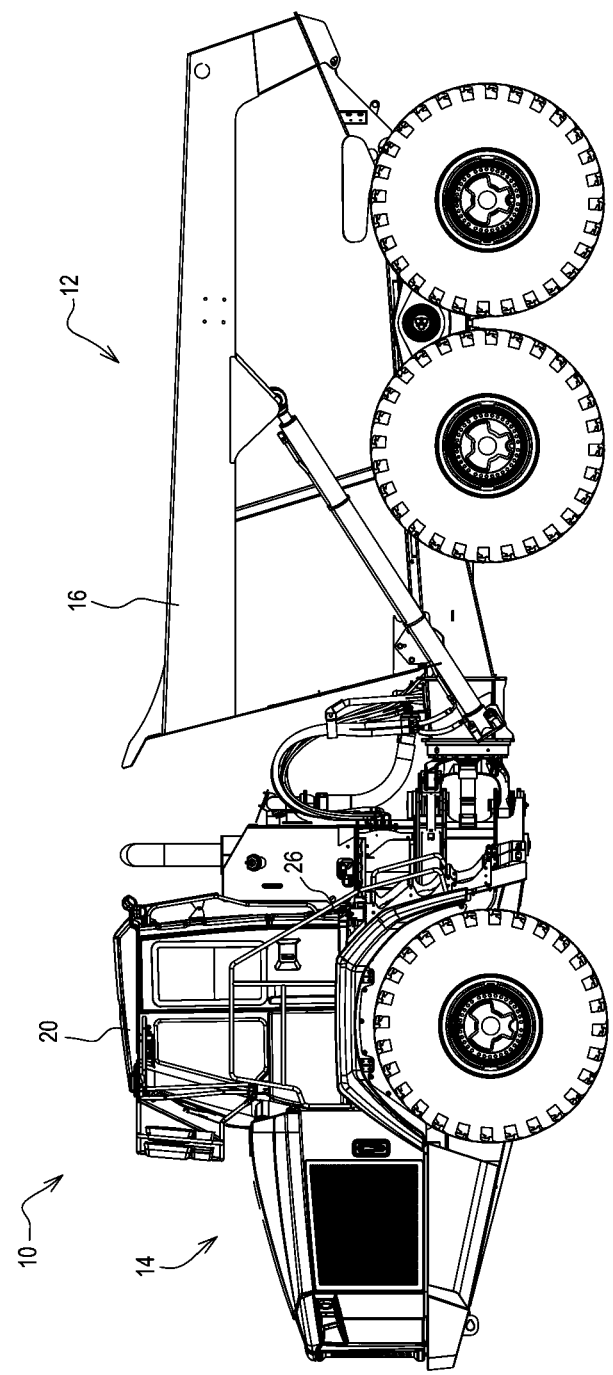
FIG. 1 is a simplified side elevation view of a machine in the form of, for example, an articulate dump truck.

Referring to FIG. 1, there is shown a machine 10 configured, for example, as an articulated dump truck. As such, the machine 10 may have a rear section 12 and a front section 14. The rear and front sections 12, 14 may be articulated to one another for relative pivotal movement therebetween about an articulation axis.

The rear section 12 may have a dump body 16 configured to carry material therein. The dump body may be pivoted to a rear frame of the rear section. A lift cylinder on each side of the dump body may be coupled to the rear frame and the dump body to tip the dump body to unload material from the dump body.

The front section 14 may be the power head of the machine 10 and may have a front frame 18. The engine of the machine 10 may be included in the front section 12 and mounted to the front frame 18.

Figure 2:
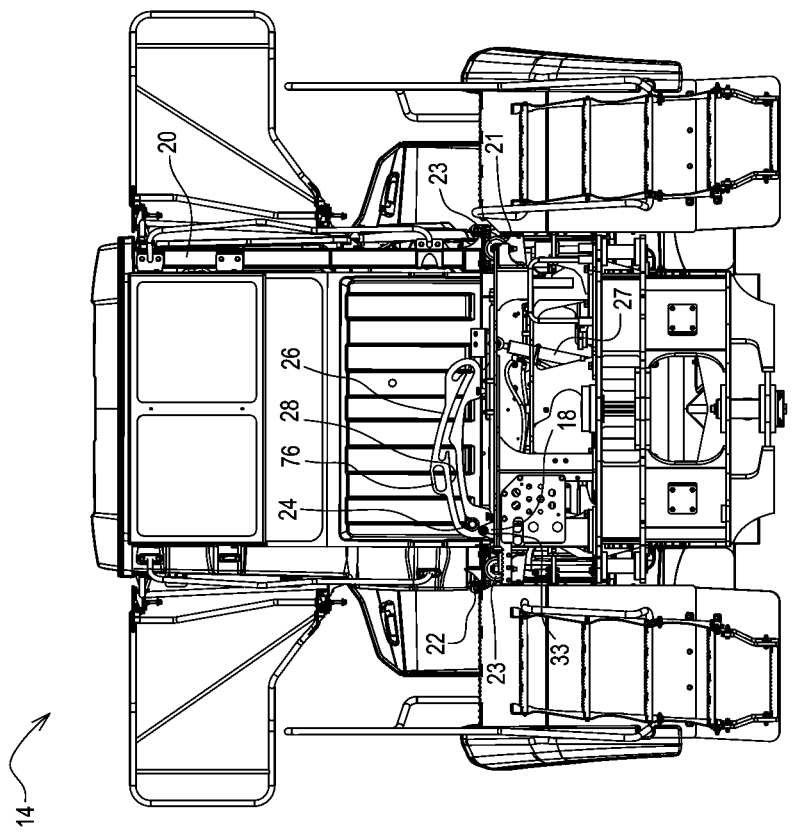
FIG. 2 is a rear elevation view showing a cab of a front section of the machine in a home position and a cab stay in a storage position.
Figure 3:
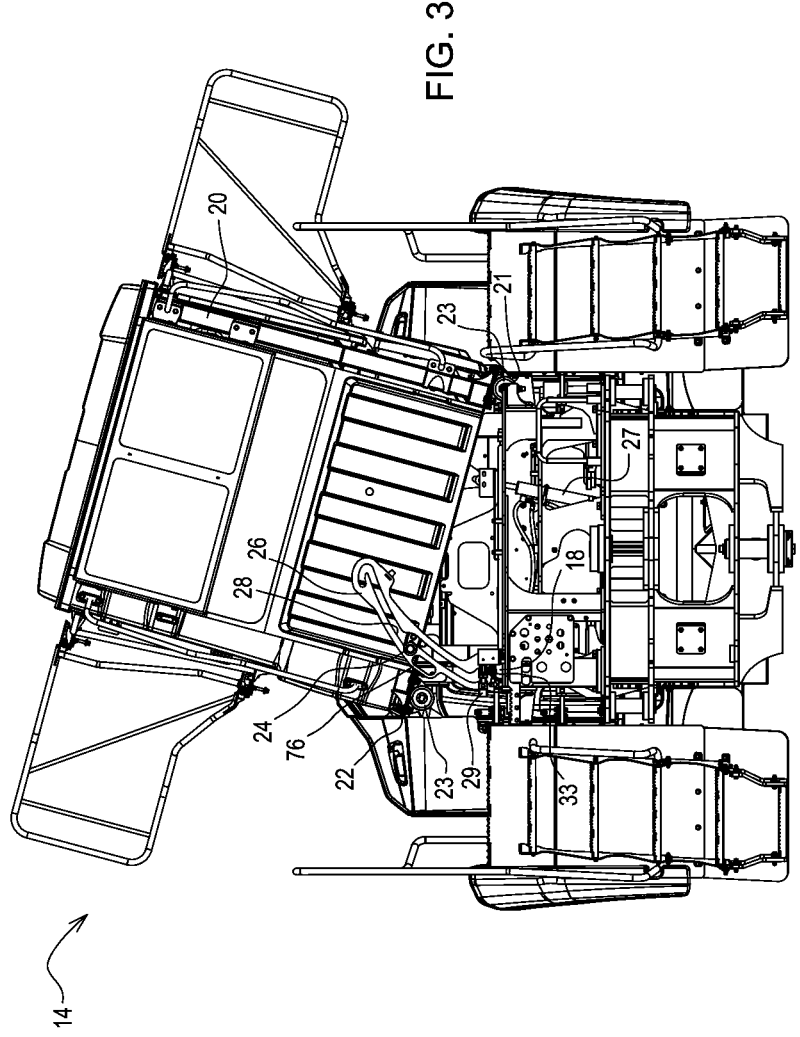
FIG. 3 is a rear elevation view showing the cab held in a first tilted position due to positioning of the cab stay in a first use position.
Figure 4:
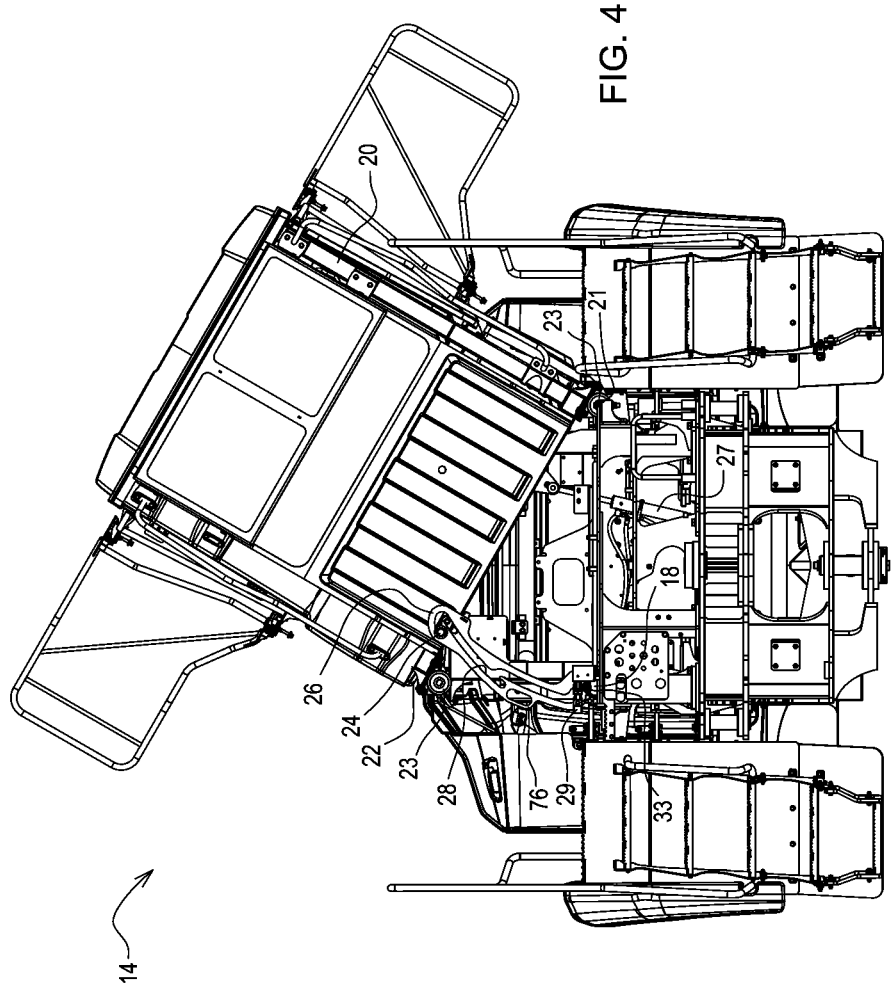
FIG. 4 is a rear elevation view showing the cab held in a second tilted position due to positioning of the cab stay in a second use position.
Figure 5:
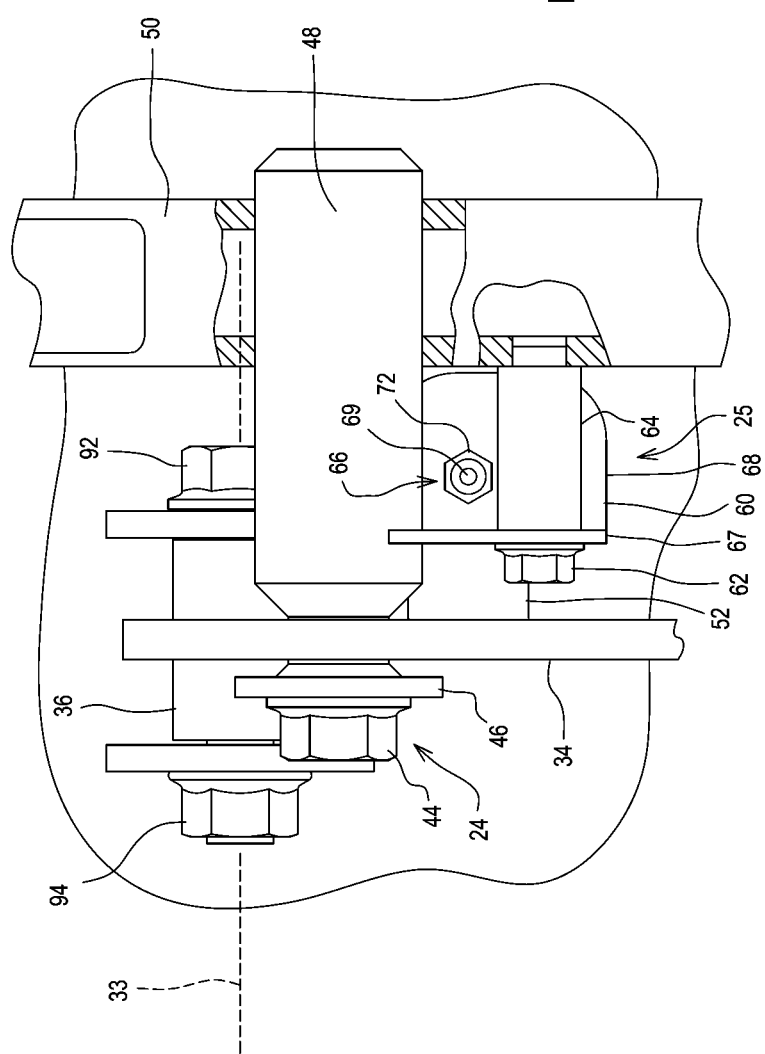
FIG. 5 is a top plan view showing a stud and stay retainer of the cab in connection with the stay retainer.
Figure 6:
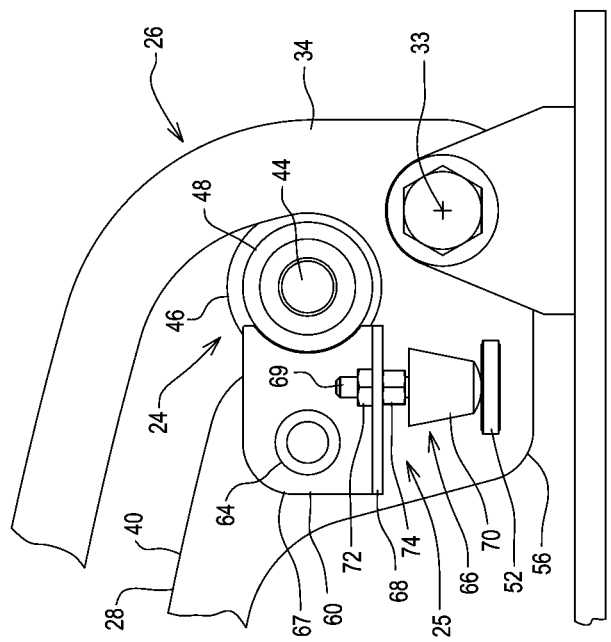
FIG. 6 is a front elevation view showing engagement of the stay retainer with a tab of the cab stay.
Figure 7:
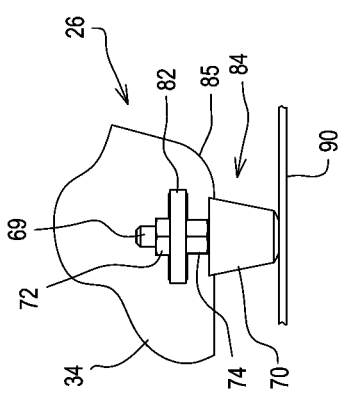
FIG. 7 is a front elevation view showing engagement of the cab stay with the frame.

Referring to FIGS. 2-4, the front section 12 may have a tiltable cab 20. The cab 20 may be coupled pivotally to the front frame 18 to pivot relative to the frame 18 about a pivot axis 21 between a down or home position (FIG. 2), a first tilted position (FIG. 3), and a second tilted position (FIG. 4). The pivot axis 21 may be oriented in any suitable direction, illustratively in a fore-aft direction on the right side of the cab 20. The cab 20 may be positioned in the home position for normal operation of the machine 10. The first and second tilted positions may be used for service and/or diagnostic testing of the machine 10. For example, the first tilted position may be sufficiently high to perform such service and diagnostic testing (such as when the machine 10 is operating), and the second tilted position may be sufficiently high to allow removal and installation of parts if needed.

A frame 22 of the cab 20 may be mounted at its corners to the front frame 18. Each corner of the cab frame 22 may be mounted to a respective dampener or isolator 23 fixed to the front frame 18. The right front corner of the cab frame 22 may be mounted to a right front isolator 23 fixed to the front frame 18. The right rear corner of the cab frame 22 may be mounted to a right rear isolator 23 fixed to the front frame 18. The left front corner of the cab frame 22 may be mounted to a left front isolator 23 fixed to the front frame 18. The left rear corner of the cab frame 22 may be mounted to a left rear isolator 23 fixed to the front frame 18. Each isolator 23 may include a bushing, a pin extending through the bushing such that the opposite end portions of the pin lie outside the bushing, and rubber filling the bushing between the bushing and the pin so as to be adhered to the bushing and the pin.

Each corner of the cab frame 22 may be mounted to the respective isolator 23 using two fasteners, each fastener including a bolt extending through a flange of the cab frame 22 (both fasteners through the same flange at each corner), a respective flange coupled (e.g., welded) to the bushing of the isolator 23 (two such flanges at each corner, one for each bolt), a washer of the fastener above the cab frame flange, a washer of the fastener below the respective bushing flange, and a lock nut of the fastener threaded onto the bolt. Each isolator 23 may be fixed to the front frame 18 using two fasteners, each fastener including a bolt extending through a respective end portion of the pin of the isolator 23, a respective lug of the front frame 18, a washer of the fastener above such isolator end portion, a washer of the fastener below such frame lug, and a lock nut of the fastener threaded onto the bolt.

The cab 20 may be tilted about the pivot axis 21. To do so, the left front corner and the left rear corner may be unfastened from the respective isolators 23. A person may operate a jack 29 (e.g., using a lever inserted into the jack 29 to operate the jack 29) to extend a hydraulic cab-lift cylinder 27 coupled to the frame 18 and the cab 20 therebetween so as to tilt the cab 20 about the axis 21. The cab 20 may be lowered upon activating a release of the jack 29.

Referring to FIGS. 5-10, the cab 20 may have a stud 24 and a stay retainer 25. The front section 12 may have a cab stay 26 coupled pivotally to the frame 18 to pivot relative to the frame 18 between a storage position (FIG. 2), a first use position (FIG. 3), and a second use position (FIG. 4). The cab stay 26 may have a slot 28 in which the stud 24 is positioned in and between the home and tilted positions of the cab 20. In the first and second use positions of the cab stay 26 respective use notches 30, 32 of the slot 28 engage the stud 24 holding the cab 20 in the respective first and second tilted positions of the cab 20. The stay retainer 25 may apply pressure on the cab stay 26 due at least partially to the weight of the cab 20 so as to hold the cab stay 26 in the storage position when the cab 20 is positioned in the home position of the cab 20. The stay retainer 25 may press the cab stay 26 against the frame 18 when the cab 20 is positioned in the home position of the cab 20. The cab stay 26 may thus be held against movement in its storage position to prevent audible noise vibration from the cab stay 26 in the storage position. In some embodiments, the stay 26 may have a single use notch to hold the cab 20 in a single tilted position, or the stay 26 may more than two use notches to hold the cab 20 selectively in more than two tilted positions.

A proximal end portion 35 of the stay 26 may be coupled pivotally to the frame 18 for pivotal movement relative to the frame 18 about a pivot axis 33 between the storage position, the first use position, and the second use position. The stay 26 may have a plate 34 (made, for example, of high strength low alloy steel) and a tubular boss 36 (made, for example, of steel such as 1020 HR QL-2 steel) positioned in a through-hole of the plate 34 and coupled (e.g., welded) to the plate 34 with portions of the boss 36 on either side of the plate 34. The boss 36 may be positioned between two flanges of the frame 18, and an axle on which the stay 26 may pivot may extend through a through-hole of the first flange, the boss 36, and a through-hole of the second flange. The axle may be configured as a cap screw 92 (made, for example, of steel) fixed to the two flanges with a flange nut 94 (made, for example, of steel) and may define the pivot axis 33.

The plate 34 may have the slot 28. The stud 24 extends into and travels within the slot 28 between the home and tilted positions of the cab 20. The slot 28 has a storage notch 38 in which the stud 24 is positioned in the storage position of the stay 26 and the home position of the cab 20. The slot 28 has the first use notch 30 in which the stud 24 is positioned in the first use position of the stay 26 and the first tilted position of the cab 20. The slot 28 has the second use notch 32 in which the stud 24 is positioned in the second use position of the stay 26 and the second tilted position of the cab 20.

A first elongated path 40 of the slot 28 may interconnect the storage notch 38 and the first use notch 30, and a second elongated path 42 of the slot 28 may interconnect the first use notch 30 and the second use notch 32. The stud 24 may travel along the first path 40 between the storage and first use positions due to movement of the cab 20 between the home and first tilted positions, and may travel along the second path 42 between the first and second use positions due to movement of the cab 20 between the first and second tilted positions.

The stud 24 may include a cap screw 44 (made, for example, of steel) extending through a bushing 46 (made, for example, of steel such as 1020 HR QL-2 steel) and threaded into a tubular boss 48 (made, for example, of steel such as 1020 HR QL-2 steel). The boss 48 may extend through two opposite side walls of a beam 50 of the cab frame 22 and may be coupled (e.g., welded) to the side walls (the beam 50 made, for example, of steel). A tapered portion of the boss 48 may taper from a larger outside diameter (OD) portion of the boss 48, which is coupled to the side walls of the beam 50, to a smaller OD portion of the boss 48 that extends through the slot 28. The tapered portion may help to keep the stay 26 generally over the smaller OD portion. The bushing 46 may be rearward of the plate 34 to maintain the cap screw 44 within the slot 28.

The cab stay 26 may have a tab 52 (FIG. 11). The stay retainer 25 may engage the tab 52 so as to press the stay 26 down to hold the stay 26 in the storage position when the cab 20 is positioned in the home position to prevent audible noise vibration of the cab stay 26 in the storage position. Such engagement of the stay retainer 25 against the tab 52 may cause a distal end portion 54 of the cab stay 26 to engage the frame 18 in the storage position of the cab stay 26.

The tab 52 may be appended to the plate 34. The tab 52 may be appended to a first nose 56 of the plate 34. The tab 52 may be positioned between the proximal end portion 35 and the distal end portion 54, closer to the proximal end portion 35 than the distal end portion 54 so that downward pressure is applied to the tab 52 by the stay retainer 25 to hold the stay 26 in the storage position when the cab 20 is positioned in the home position.

The tab 52 may have a tongue 58 that extends into a through-hole of the plate 34. The tab 52 may be coupled to the plate 34 such as, for example, by welding around the tongue 58.

The stay retainer 25 may be coupled to the cab frame 22. The stay retainer 25 may include an L-shaped bracket 60 (made, for example, of high strength low alloy steel), a cap screw 62 (made, for example, of steel), a tubular boss 64 (made, for example, of steel such as 1020 HR QL-2 steel), and a bumper 66. The bracket 60 may have a first or upper wall 67 and a second or lower bracket wall 68, the walls 67, 68 perpendicular to one another. The upper bracket wall 67 may be fastened to the beam 50 by threading the cap screw 62 into the boss 64 which may be coupled (e.g., welded) to a rear side wall of the beam 50. The boss 60 may have a larger OD portion against which the bracket 60 is fastened and that abuts the rear side wall of the beam 50 and a smaller OD portion extending into the beam 50 through a through-hole of the rear side wall of the beam.

The upper bracket wall 67 may have a left edge that is concave to fit about the larger OD portion of the boss 48. The left edge may be welded to the larger OD portion of the boss 48. In other embodiments, it may merely abut the larger OD portion of the boss 48, or there may be clearance between the left edge and the larger OD portion of the boss.

The bumper 66 may depend from the lower bracket wall 68 for engagement with the tab 52 in the home position of the cab 20. The bumper 66 may include a threaded bolt 69 (made, for example, of steel) extending through a through-hole of the lower bracket wall 68, a compressible member 70 (e.g., rubber) adhered to an end of the threaded bolt 69, a nut 72 (made, for example, of steel) threaded onto the bolt 69 above the bracket 60 into contact therewith, and a lock nut 74 (made, for example, of steel) threaded onto the bolt 69 below the bracket 60 into contact therewith.

The compressible member 70 may engage the tab 52 holding the stay 26 in the storage position when the cab 20 is positioned in the home position. Adjustment of the nuts on the pin may be used to adjust the height of the compressible member 70 and thus the pressure applied to the tab 52 by the compressible member 70.

The distal end portion 54 may have a tab 82 and a bumper 84. The tab 82 (FIG. 12) may be appended to a second nose 85 of the plate 34. The tab 82 may have a tongue 86 that extends into a through-hole of the plate 34. The tab 82 may be coupled to the plate 34 such as, for example, by welding around the tongue 86.

The bumper 84 may depend from the tab 82 for engagement with a plate 90 of the front frame 18 in the storage position of the cab stay 26 due to positioning of the cab 20 in the home position. The bumper 84 may include a threaded bolt 69 extending through a through-hole of the tab 82, a compressible member 70 (e.g., rubber) adhered to an end of the threaded bolt 69, a nut 72 threaded onto the bolt 69 above the tab 82 into contact therewith, and a lock nut 74 threaded onto the bolt 69 below the tab 82 into contact therewith.

The compressible member 70 may be pressed downwardly against the frame plate 90 due to downward pressure on the tab 52 by the stay retainer 25 when the cab 20 is positioned in the home position. The compressible member 70 may thus be held against frame plate 90 in the storage position when the cab 20 is positioned in the home position, preventing audible noise vibration of the stay 26 in the storage position. Adjustment of the nuts 72, 74 along the bolt 69 may be used to adjust the height of the compressible member 70 and thus the pressure applied to the frame plate 90 by the compressible member 70 to avoid noise vibration.

The cab stay 26 may have a handle 76. The handle 76 may be included in the plate 34 above the slot 28. The handle 76 may include a hand-grip 78 configured to be gripped by the hand of a person and a through-hole 80 to receive therethrough the fingers of the person. The handle 76 may be used to lift the stay 26 so as to remove the stud 24 out of either use notch 30, 32 to allow lowering of the cab 20.

In operation, when the cab 20 is positioned in the home position, the bumper 66 of the stay retainer 25 may press down on the tab 52 of the cab stay 26 under the weight of the cab 25 so as to press the bumper 84 of the distal end portion 54 of the cab stay 26 against the plate 90 of the front frame 18 so as to hold the stay 26 in the storage position. The cab stay 26 may be held down in this way so as to prevent the cab stay 26 from vibrating in manner that would generate audible noise. In the storage position, the stud 24 may be positioned in the storage notch 38. The storage notch 38 may be oversized relative to the stud 24 to ensure that there is no direct mechanical connection between the cab stay 26 and the boss 48 when the cab 20 is in the home position. This lack of contact prevents vibration in the frame 18 from being transmitted to the cab 20, through the cab stay 26.

The cab 20 may be tilted about the pivot axis 21 to the first tilted position. To do so, the left front corner and the left rear corner may be unfastened from the respective isolators 23, and the jack 29 may be operated to extend the cab-lift cylinder 27. The stud 24 may travel in the slot 28 and raise the cab stay 26 upon tilting of the cab 20 toward the first tilted position. When the stud 24 reaches a point adjacent to the first notch 30, the cab 20 may be lowered into the notch 30 by activating the jack release. As such, the stud 22 may be positioned in the first use notch 30 in engagement therewith such that the cab stay 26 holds the cab 20 in the first tilted position when the cab stay 26 is positioned in its first use position.

The cab 20 may be tilted about the pivot axis 21 to the second tilted position. To do so, the left front corner and the left rear corner may be unfastened from the respective isolators 23, and the jack 29 may be operated to extend the cab-lift cylinder 27. The stud 24 may travel in the slot 28 and raise the cab stay 26 upon tilting of the cab 20 toward the second tilted position. When the stud 24 reaches a point adjacent to the second use notch 32, the cab 20 may be lowered into the notch 32 by activating the jack release. As such, the stud 22 may be positioned in the second use notch 32 in engagement therewith such that the cab stay 26 holds the cab 20 in the second tilted position when the cab stay 26 is positioned in its second use position.

The cab 20 may be lowered about the pivot axis 21 to the home position or the first use position. A person grips the handle 76 and lifts up on the cab stay 26, removing the stud 24 from the respective use notch. The jack release may then be activated so that the cab 20 lowers to the home or first tilted position, during which the stud 24 may travel in the slot 28 so as to lower the cab stay 26 to the storage or first use position. The stud 22 may be positioned in the storage notch 38 or the first use notch 30 in engagement therewith upon such lowering. If the cab 20 is lowered to the storage position, the stay retainer 25 re-engages the tab 52 so as to press the tab 52 down under the weight of the cab 20, thereby pressing the distal end portion 54 of the cab stay 26 down against the frame 18 to prevent the stay 26 from vibrating in a manner that would generate audible noise.

For ease of illustration, no welds and threads have been shown, but are to be understood.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A machine, comprising:
   a frame,
   a cab coupled pivotally to the frame to move relative to the frame between a home position and a tilted position, the cab comprising a stud and a stay retainer, and
   a cab stay coupled pivotally to the frame to move relative to the frame between a storage position and a use position, the cab stay comprising a slot in which the stud is positioned in and between the home and tilted positions of the cab, in the use position of the cab stay a notch of the slot engages the stud holding the cab in the tilted position of the cab, the stay retainer applying pressure on the cab stay due at least partially to the weight of the cab so as to hold the cab stay in the storage position when the cab is positioned in the home position of the cab, the stay retainer spaced apart from the cab stay when the cab is positioned in the tilted position of the cab.

2. The machine of claim 1, wherein the stay retainer presses the cab stay against the frame when the cab is positioned in the home position of the cab.

3. The machine of claim 1, wherein the cab stay comprises a tab, and the stay retainer engages the tab.

4. The machine of claim 3, wherein the cab stay comprises a plate, the plate comprises the slot, and the tab is appended to the plate.

5. The machine of claim 3, wherein the cab stay comprises a proximal end portion coupled pivotally to the cab and a distal end portion that engages the frame in the storage position of the cab stay, and the tab is positioned between the proximal end portion and the distal end portion.

6. The machine of claim 5, wherein the tab is positioned closer to the proximal end portion than the distal end portion.

7. The machine of claim 5, wherein the distal end portion comprises a bumper.

8. The machine of claim 3, wherein the cab stay comprises a plate, the plate comprises the slot, the tab is a first tab which is appended to a first nose of the plate, the cab stay comprises a second tab appended to a second nose of the plate and a bumper depending from the second tab.

9. The machine of claim 1, wherein the cab stay comprises a handle.

10. The machine of claim 9, wherein the cab stay comprises a plate, the plate comprises the slot and the handle above the slot, and the handle comprises a hand-grip and a through-hole.

11. A machine, comprising:
a frame,
a cab coupled pivotally to the frame to move relative to the frame between a home position and a tilted position, the cab comprising a stud and a stay retainer, and
a cab stay coupled pivotally to the frame to move relative to the frame between a storage position and a use position, the cab stay comprising a slot in which the stud is positioned in and between the home and tilted positions of the cab, in the use position of the cab stay a notch of the slot engages the stud holding the cab in the tilted position of the cab, the stay retainer applying pressure on the cab stay due at least partially to the weight of the cab so as to hold the cab stay in the storage position when the cab is positioned in the home position of the cab, wherein the cab stay comprises a tab, and the stay retainer engages the tab, and the stay retainer comprises a bumper that engages the tab in the home position of the cab.

12. The machine of claim 11, wherein the cab comprises a beam, the stay retainer comprises a bracket fastened to the beam, and the bumper depends from the bracket into engagement with the tab in the home position of the cab.

* * * * *